(12) United States Patent
Doherty et al.

(10) Patent No.: US 7,080,134 B2
(45) Date of Patent: Jul. 18, 2006

(54) SYSTEMS AND METHODS FOR SOFTWARE DISTRIBUTION AND MANAGEMENT

(75) Inventors: Matthew T. Doherty, Newport Beach, CA (US); Paul R. Savage, Beaverton, OR (US); Kathleen L. Sillonis, Portland, OR (US); Andrew L. Ruse, Riverton, UT (US); Peter E. Johnson, Lehi, UT (US); Ryan B. Erickson, Lehi, UT (US)

(73) Assignee: Intel Corporation, Santa Clara, CA (US)

( * ) Notice: Subject to any disclaimer, the term of this patent is extended or adjusted under 35 U.S.C. 154(b) by 575 days.

(21) Appl. No.: 09/893,740

(22) Filed: Jun. 29, 2001

(65) Prior Publication Data

US 2003/0018763 A1    Jan. 23, 2003

(51) Int. Cl.
*G06F 15/16* (2006.01)
(52) U.S. Cl. .............................. 709/221; 713/1; 713/2; 713/100
(58) Field of Classification Search ................ 709/223, 709/222, 221; 713/12, 2, 201, 100, 1
See application file for complete search history.

(56) References Cited

U.S. PATENT DOCUMENTS

| | | | | |
|---|---|---|---|---|
| 5,968,126 | A * | 10/1999 | Ekstrom et al. ............ 709/225 |
| 6,167,567 | A * | 12/2000 | Chiles et al. ................ 717/173 |
| 6,345,294 | B1 * | 2/2002 | O'Toole et al. .............. 709/222 |
| 6,524,245 | B1 * | 2/2003 | Rock et al. .................. 600/437 |
| 6,601,096 | B1 * | 7/2003 | Lassiter, Jr. .................. 709/222 |
| 6,684,327 | B1 * | 1/2004 | Anand et al. .................. 713/2 |
| 6,687,245 | B1 * | 2/2004 | Fangman et al. ........... 370/356 |
| 6,711,688 | B1 * | 3/2004 | Hubacher et al. ........... 713/201 |
| 6,742,025 | B1 * | 5/2004 | Jennery et al. ............. 709/220 |
| 6,810,478 | B1 * | 10/2004 | Anand et al. .................. 713/2 |

OTHER PUBLICATIONS

PXE Production Development Kit Instructions Version 3.0, Aug. 27, 1999, published by Intel Corporation.*

* cited by examiner

*Primary Examiner*—John Follansbee
*Assistant Examiner*—M. A. Siddiqi
(74) *Attorney, Agent, or Firm*—Pillsbury Winthrop Shaw Pittman LLP

(57) ABSTRACT

A method and system for obtaining service from a management server is presented. A client sends a request for service to a management agent. The management agent forwards the request for service to a management server via Hypertext Transfer Protocol (HTTP). The management server sends service information via HTTP to the management agent. The management agent then forwards the service information to the client. As such, the client may obtain service even where network nodes, such as switches and routers, intervene between the client and the management server.

11 Claims, 8 Drawing Sheets

SYSTEMS AND METHODS FOR SOFTWARE DISTRIBUTION AND MANAGEMENT

BACKGROUND

1. Field

This invention relates in general to software distribution and management over a network. More specifically, this invention relates to software distribution to a client and management of a client over a network.

2. General Background and Related Art

Management systems facilitate the distribution of software to target devices and the maintenance of such devices. For example, an operating system (OS) may be distributed over a network to one or more client machines from a remote server, which may be termed a management server. The management server may also maintain the client machines, such as by monitoring client operability or modifying client configurations. Some systems may perform only software distribution or maintenance functions, while others may perform both functions.

In a typical management environment, a client may include a network card that is configured to communicate with a remote server. At a boot-up, but before loading an operating system into main memory, a client may contact a management server and request instructions therefrom. Such instructions may cause the client to boot to disk, reformat a disk or disks of the client, or install a predetermined OS on the client. Software may be downloaded from a remote location over the network, such as from the management server or another network device accessible to the client. Specifically, Intel Corporation offers an OS distribution system known as a Preboot Execution Environment (PXE) system. PXE-enabled clients may be managed by remote PXE servers.

Network protocols enable communications between a client and a management server. For instance, the Dynamic Host Configuration Protocol (DHCP), RFC 1541, and the Bootstrap Protocol (BOOTP), RFC 951, allow a booting host, such as a client, to configure itself dynamically and without user intervention. As such, DHCP or BOOTP may assign a host an IP address and convey to the host a file from which to download a boot program from some management server, the management server's address, and the address of an Internet gateway (where present).

In a management system, a database may store information relating to managed machines, and management software may maintain the machines represented in the database. Maintenance functions associated with the management software may include application distribution, backup and recovery, performance monitoring, and preemptive or responsive problem diagnostic tools.

FIG. 1 (Prior Art) depicts system 100, which incorporates software distribution and maintenance systems. System 100 comprises a client 101, a management server 110, and a management database 120. These devices may communicate within a virtual local area network (VLAN) 140. The devices may be coupled to a switch 150 and a router 160. Router 160 is coupled to another network, such as the Internet 170. The Internet 170 is coupled to a router 180 and a switch 190. A management server 130 is coupled to switch 190.

Client 101 may be managed by management server 110. Management database 120 may store information associated with various clients, such as client 101, within VLAN 140. Management server 130 is separated from client 101, management server 110, and management database 120 by network nodes, such as switch 150, router 160, router 180, and switch 190.

Many client computers, such as client 101, may be included in VLAN 140. A boot sequence on client 101 may be set such that client 101, at boot-up, first attempts to boot from a local computer-readable medium, such as a local hard drive, a floppy disk, or a CD-ROM, and then attempts to boot to a remote server, such as management server 110. By changing the boot sequence such that the network is ordered before a local computer-readable medium, client 101 may initiate contact with management server 110. Management server 110 may then manage client 101.

A user who is present at client 101 may change the boot sequence on client 101. After boot-up to management server 110 occurs and client 101 is successfully managed, client 101 should boot to a local computer-readable medium at the next boot-up. In existing systems, however, client 101 continues to boot to management server 110 at each boot-up absent user intervention at client 101. This problem is especially acute in networks comprising multiple clients. A user must manually change the boot sequence at each client subsequent to management functions being performed by management server 110.

Another problem in system 100 occurs when client 101 requires services that are not supported by a management server within VLAN 140. Communication protocols such as DHCP and BOOTP are typically filtered on switches and routers, such as switch 150, router 160, router 180, and switch 190 in system 100. Therefore, a DHCP or BOOTP request by client 101 to management server 130, which is located outside of VLAN 140, will fail. Moreover, in a data center such as that shown in system 100, wherein VLAN 140 controls the type and amount of traffic that can occur, the problem is further exacerbated. In a large network, hundreds of VLANs such as VLAN 140 may be encountered. One management server is required for each VLAN that includes clients to be managed.

Client 101 may be managed according to information stored within management database 120. For instance, a user may input into management database 120 an operating system type to be installed on client 101. Management software on management database 120 may propagate this information to management server 110. At a boot-up, client 101 may request operating system installation information, and management server 110 may respond with such information. Thereafter, a user may manually update management database 120 to record that the operating system is now installed on client 101. In this system, copies of information are stored in both management database 120 and management server 110. Consistency of data on management server 110 and on management database 120 may be compromised, and unnecessary exchanges of data may occur.

Therefore, what is needed are methods and systems for software distribution to a client and management of a client.

DETAILED DESCRIPTION

The following detailed description refers to the accompanying drawings that illustrate exemplary embodiments of the present inventions. Other embodiments are possible and modifications may be made to the embodiments without departing from the spirit and scope of the invention. Therefore, the following detailed description is not meant to limit the invention. Rather, the scope of the invention is defined by the appended claims.

It will be apparent to one of ordinary skill in the art that the embodiments as described below may be implemented in many different embodiments of software, firmware, and hardware in the entities illustrated in the figures. The actual software code or specialized control hardware used to implement the present invention is not limiting of the present invention. Thus, the operation and behavior of the embodiments will be described without specific reference to the actual software code or specialized hardware components. The absence of such specific references is feasible because it is clearly understood that artisans of ordinary skill would be able to design software and control hardware to implement the embodiments of the present invention based on the description herein with only a reasonable effort and without undue experimentation.

Moreover, the processes associated with the presented embodiments may be stored in any storage device, such as, for example, a computer system (non-volatile) memory, an optical disk, magnetic tape, or magnetic disk. Furthermore, the processes may be programmed when the computer system is manufactured or via a computer-readable medium at a later date. Such a medium may include any of the forms listed above with respect to storage devices and may further include, for example, a carrier wave modulated, or otherwise manipulated, to convey instructions that can be read, demodulated/decoded and executed by a computer.

1. Controlling the Obtaining of Service from a Management Server

A method and system for controlling the obtaining of service from a management server, as presented herein, involves an indicator on a client. The indicator on the client signifies whether a previous boot-up of the client was to a management server. The indicator is checked at a boot-up of the client. A boot sequence on the client is changed if the indicator signifies that the previous boot-up of the client was to a management server. Accordingly, the client may, without user intervention, boot to a local computer-readable medium after being administered by a management server.

Figure 1:
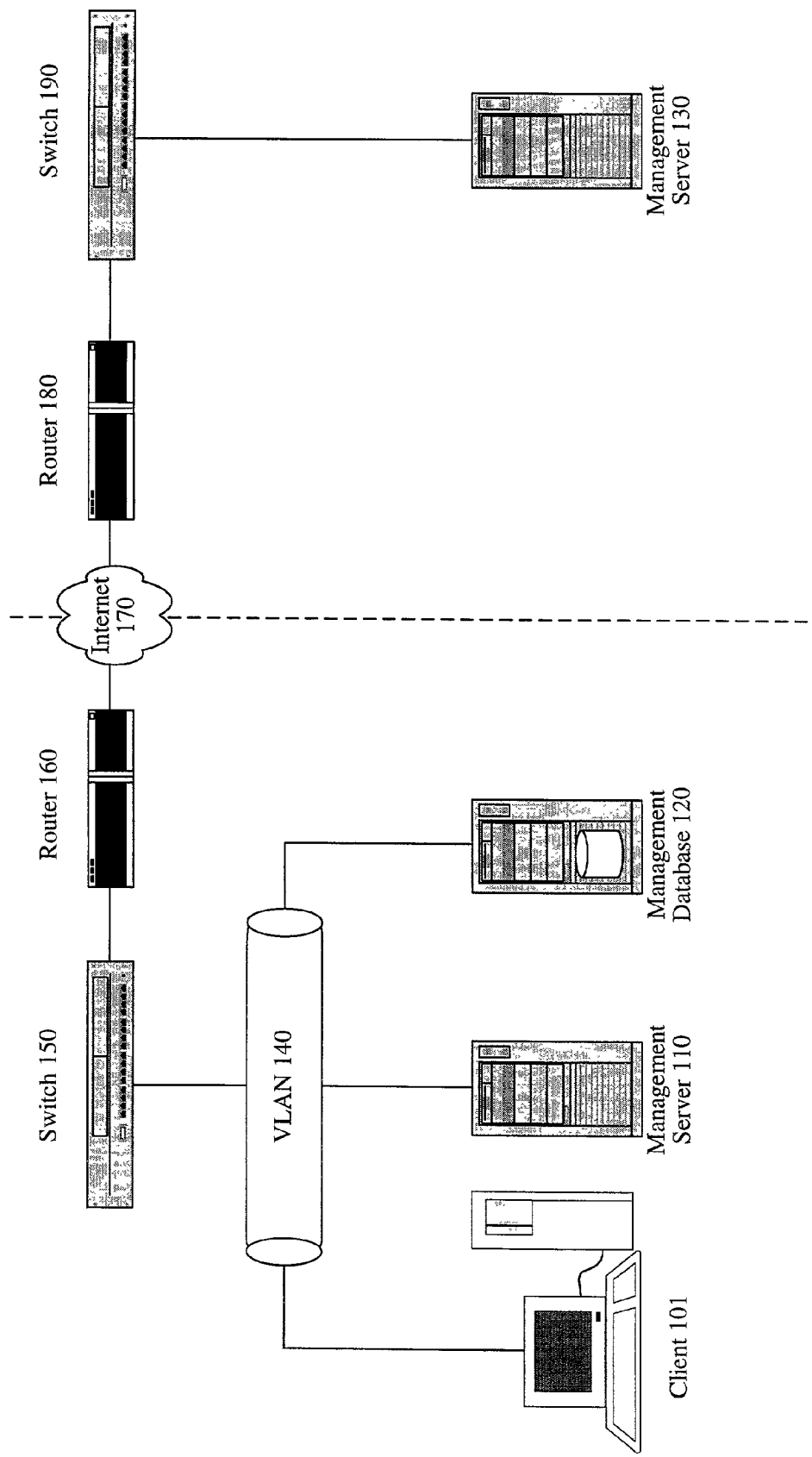
FIG. 1 (Prior Art) illustrates a system for software distribution to a client and management of a client.
Figure 2:
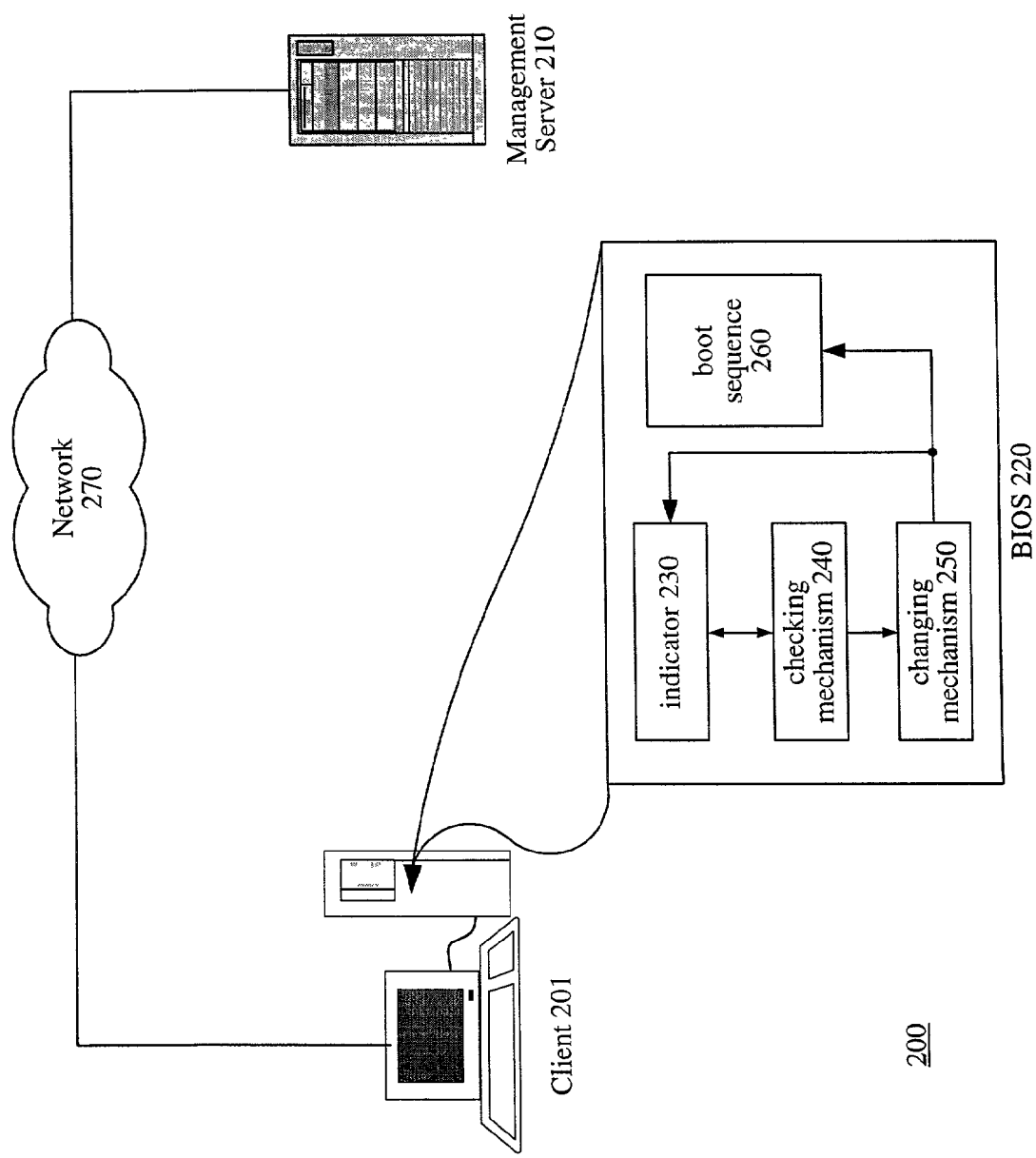
FIG. 2 is a high-level diagram of a system according to an embodiment of the present invention.

FIG. 2 illustrates system 200 according to an embodiment of the present invention. System 200 comprises a client 201 and a management server 210 communicating over a network 270. Network 270 may comprise an Intranet or Internet that is wireless, infrared, or cabled. Management server 210 may comprise a pull-based server, such as a Preboot Execution Environment (PXE) server.

Client 201 may include a network adapter card, such as a PXE-enabled card, or network circuitry integrated within client 201. Client 201 may include a basic input/output system (BIOS) 220. BIOS 220 is distinct from an operating system that client 201 may boot to during boot-up. BIOS 220 may be implemented in a volatile or non-volatile memory such as FLASH memory. BIOS 220 may comprise an indicator 230, a checking mechanism 240, a changing mechanism 250, and a boot sequence 260. The components of BIOS 220 may be implemented in hardware or software, or a combination thereof.

Indicator 230 signifies whether a previous boot-up of client 201 was to a management server. Indicator 230 may comprise a counter or a flag of one or more bits. Indicator 230 may initially be set to zero. In an exemplary implementation, zero may signify that a previous boot-up was a local boot-up. Indicator 230 may be set to a value of one to signify that a previous boot-up was to a management server.

Checking mechanism 240 checks the value or status of indicator 230 at boot-up. Changing mechanism 250 may change boot sequence 260 if indicator 230 signifies that the previous boot-up of the client was to a management server. As a result of the change, a local computer-readable medium may be ordered before a remote management server in the boot sequence. That is, boot sequence 260 may be ordered such that client 201 first attempts to boot to a local computer-readable medium and then attempts to boot to network 270.

Accordingly, after management server 210 manages client 201, client 201 at boot-up may, without user intervention, boot locally instead of again booting to management server 210. When changing mechanism 250 changes boot sequence 260, changing mechanism 250 may also set indicator 230 to specify that a previous boot-up of client 201 was not to a management server. Therefore, not only will client 201 boot locally on the present boot-up, but also client 201 will boot locally on subsequent boot-up cycles. In an exemplary implementation, a remote computer, such as management server 210, may remotely change boot sequence 260, wherein boot sequence 260 is ordered such that a remote management server (the network) appears before a local computer-readable medium. Thus, network administrators may remotely earmark one or more clients, such as client 201, to be managed. In other embodiments, a user or a local software program of client 201 may change boot sequence 260 to cause client 201 to boot to a remote management server, such as management server 210.

Figure 3:
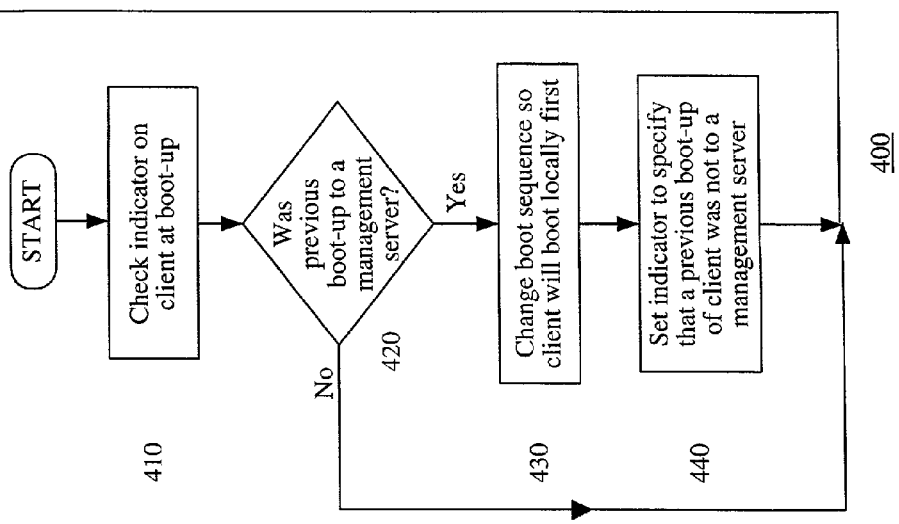
FIG. 3 is a high-level flow diagram of a method according to an embodiment of the present invention.
Figure 3:
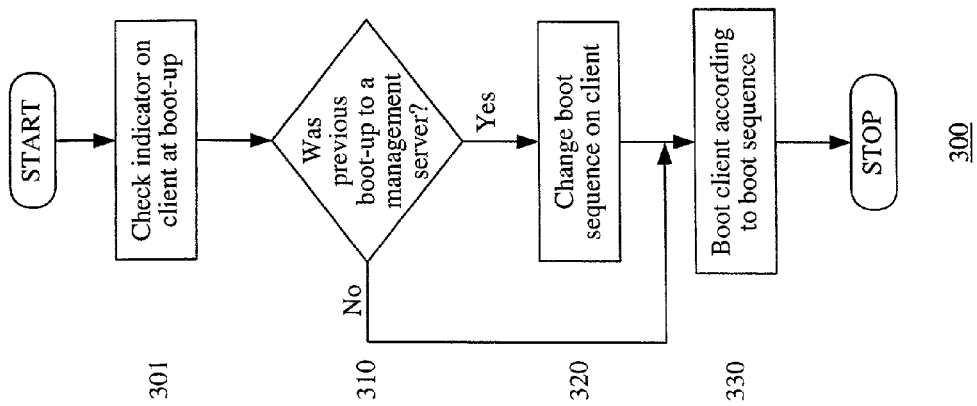

FIG. 3 is a high-level flow diagram of method 300 according to an embodiment of the present invention. In item 301, an indicator on a client is checked at boot-up. In item 310, the method tests whether the previous boot-up was to a management server. If the answer is yes, then in item 320, the boot sequence on the client is changed, and the method proceeds to item 330. If the answer is no, then the method proceeds directly to item 330. In item 330, the client is booted according to the boot sequence on the client.

Figure 4:
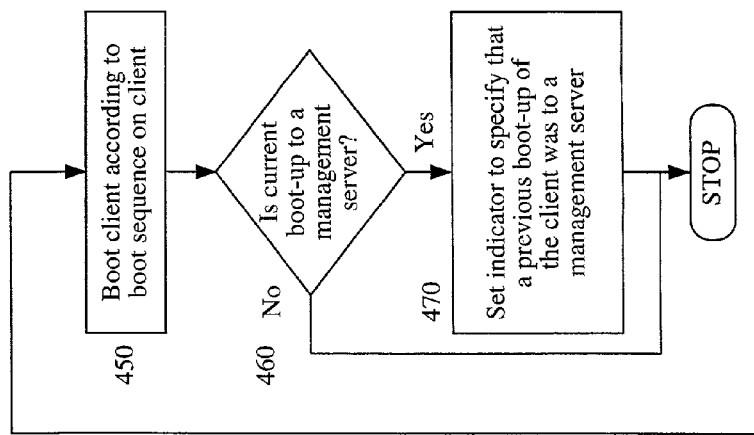
FIG. 4 is a high-level flow diagram of a method according to an embodiment of the present invention.

FIG. 4 is a high-level flow diagram of method 400 according to an embodiment of the present invention. In item 410, the indicator on the client is checked at boot-up of the client. In item 420, the method tests whether the previous boot-up was to a management server. If the answer is yes, then in item 430, the boot sequence is changed so that the client will boot locally first. In item 440, the indicator is set to specify that a previous boot-up of the client was not to a management server. If the previous boot-up was not to a management server, as tested within item 420, then the method proceeds directly to item 450. In item 450, the client is booted according to the boot sequence on the client. In item 460, the method tests whether the current boot-up is to a management server. If the answer is no, then the method ceases. If the answer is yes, then, in item 470, the indicator is set to specify that a previous boot-up of the client was to a management server.

2. Obtaining Service from a Management Server in a Network Including Intervening Network Nodes A method and system for obtaining service from a management server, as described herein, involves a client, a management agent, and a management server. A client sends a request for service to the management agent. The management agent forwards the request for service to the management server via Hypertext Transfer Protocol (HTTP). The management server sends service information via HTTP to the management agent. The management agent then forwards the service information to the client.

Figure 5:
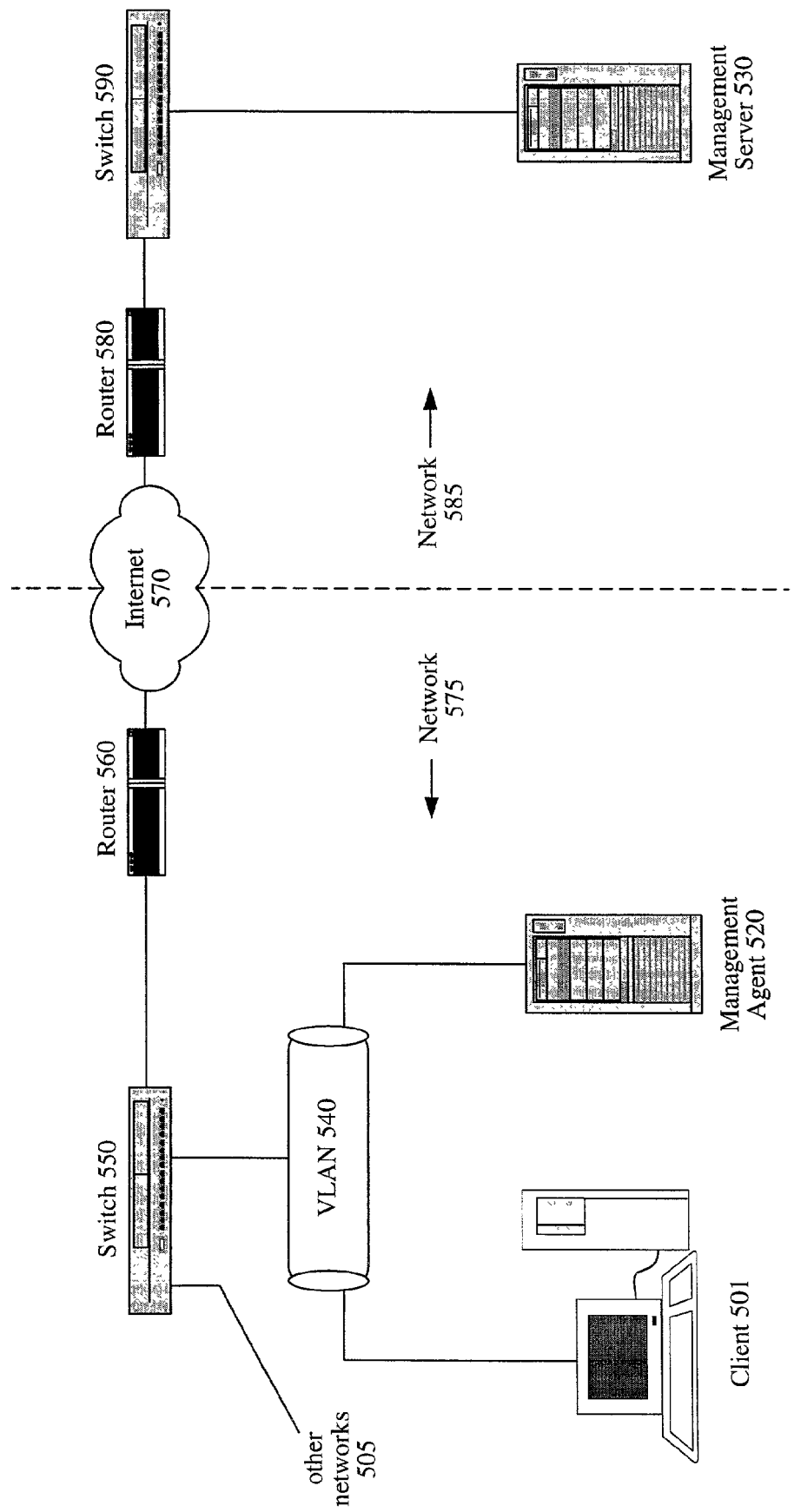
FIG. 5 is a high-level diagram of a system according to an embodiment of the present invention.

FIG. 5 is a high-level diagram illustrating system 500 according to an embodiment of the present invention. As shown, system 500 includes networks 575, 585 and switches and routers coupling networks 575, 585. More specifically, client 501 and management agent 520 communicate within virtual local area network (VLAN) 540. It is to be noted that system 500 need not include a VLAN. VLAN 540 is coupled to switch 550, which may be coupled to other networks 505, and switch 550 is coupled to router 560. Router 560 is coupled to the Internet 570, which is coupled to router 580 and switch 590. Management server 530 is coupled to switch 590. Management server 530 may comprise a pull-based server, such as a Preboot Execution Environment (PXE) server. In some embodiments, management server 530 may be included in a VLAN (not shown).

Client 501 sends a request for service to a management agent 520. That is, client 501 pulls locally. The request for service may relate to a service supported by management server 530, such as installing an operating system or an application program, or providing diagnostic, upgrade, or system recovery service or services. The request for service sent by client 501 may be sent using any network protocol, such as DHCP, RFC 1541, or BOOTP, RFC 951, which uniquely identifies a client to a server and specifies a location of boot code to a client.

Management agent 520, which may also be termed a management representative, may comprise firmware of a network device or a software agent that runs transparently on a client or server. Following a handshake with client 501, a translation agent (not shown) executing on management agent 520 or a system accessible thereby may convert the received request for service to HTTP. Management agent 520 may then forward to management server 530 the request for service via HTTP. The request is forwarded across VLAN 540, switch 550, router 560, Internet 570, router 580, and switch 590. It is to be appreciated that Internet 570 may contain many intervening nodes between management agent 520 and management server 530. More generally, management agent 520 may open an HTTP session to a subnet, VLAN, or LAN associated with a management server to retrieve service information, such as bootstrap instructions.

Following a handshake with management agent 520, management server 530 sends to management agent 520 service information via HTTP. Management agent 520 may include a translation agent (not shown) that converts the received service information from HTTP to another protocol. Management agent 520 forwards the service information to client 501 via DHCP, BOOTP, or another protocol supported by client 501 for loading and execution. Accordingly, client 501 may be managed.

Like management server 530, various clients and servers (not shown) may be coupled to switch 590. If such devices require service from a management server outside of network 585, then a management agent similar to management agent 520 may be coupled to switch 590. Such a management agent may act as an intermediary between devices coupled to switch 590 and a management server outside of network 585.

Figure 6:
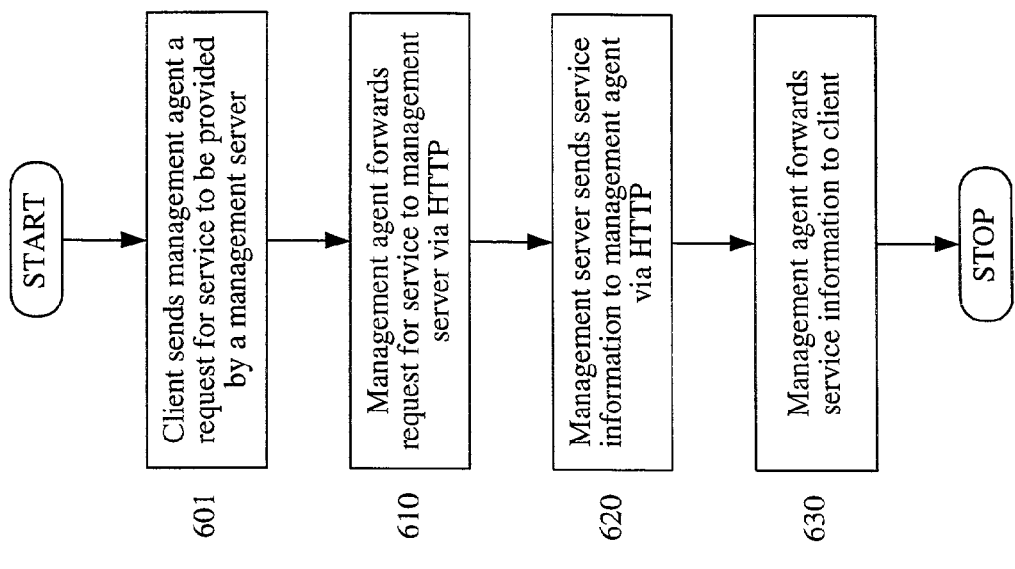
FIG. 6 is a high-level flow diagram of a method according to an embodiment of the present invention.

FIG. 6 is a high-level flow diagram of method 600 according to an embodiment of the present invention. In item 601, a client sends a management agent a request for service to be provided by a management server. In item 610, the management agent forwards the request for service to a management server via HTTP. The management server sends service information to the management agent via HTTP in item 620. In item 630, the management agent forwards the service information to the client.

According to embodiments of the present invention, one management server may effectively manage a network or enterprise. In a remote Internet-based provisioning implementation, operating systems or prepackaged operating systems and applications may be stored on an Internet server or a modular server on a website. For instance, the preconfigured operating system and associated applications for a mail server may be stored on a management server accessible to a website. A user may purchase a server for use as a mail server. The user may visit the website to purchase the operating system and applications. When powered on, the mail server may send a request for service to a management agent. The management agent may forward the request to the management server via HTTP and, in response, receive a software image with the bootstrap instructions via HTTP. The management agent may then serve the software image and bootstrap instructions to the mail server.

3. Dynamically Managing Software on a Client

A method for dynamically managing software on a client, as presented herein, involves a client and a management server. The client sends a request for service to the management server. The management server receives the request for service. The management server queries a management database about the client. The management server sends service information to the client based at least in part on the querying.

Figure 7:
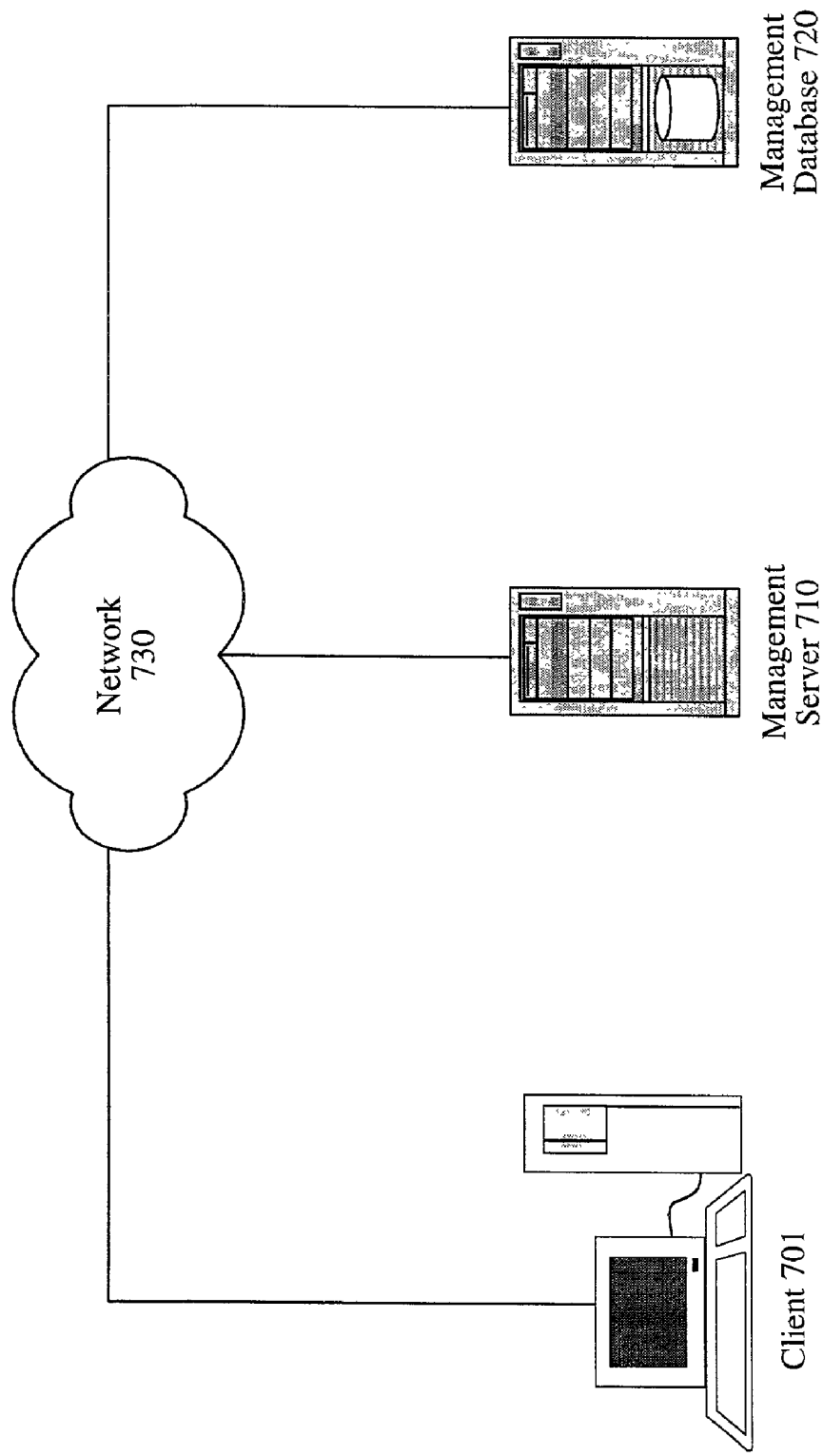
FIG. 7 is a high-level diagram of a system according to an embodiment of the present invention.

FIG. 7 is a high-level diagram of system 700 according to an embodiment of the present invention. System 700 comprises a client 701, a management server 710, and a management database 720 communicating over a network 730.

Client 701 sends a request for service to management server 710. Where management server 710 is a Preboot Execution Environment (PXE) server, client 701 may include a PXE-enabled adapter card to enable communications with management server 710.

Client 701 may be associated with two or more states. In one state, client 701 may require the services of management server 710, such as the installation of an operating system. In this state, client 701 should boot to the network. Alternatively, client 701 may boot to a custom application program stored on a floppy or another computer-readable medium. On booting from the floppy, the application program may contact a server on the network. In another state, client 701 should not boot to a remote server, but should boot locally to a computer-readable medium, such as a hard drive of client 701.

Client 701 may take various actions based on service information sent by management server 710. For instance, client 701 may boot to a local storage medium of client 701.

Alternatively, an operating system or application program specified by management server 710 may be installed on client 701. In another embodiment, client 701 may boot to an operating system retrieved from the network, and the retrieved operating system may manage client 701. Specifically, the retrieved operating system may be configured to, for example, back up the system of client 701, recover the system of client 701, evaluate system information on client 701, or wait for a request from client 701 or a user thereof.

Management server 710 receives pre-boot requests from any of a number of client machines, such as client 701, that execute in a network environment. Management server 710 may formulate and send commands to convey service information to a client. For instance, the service information may include instructions that may cause a client to boot to its local hard drive or other such medium, install a specific operating system or application program on the client, or take other action.

Management database 720 contains information about various client machines, such as client 701. Management database 720 may reside on management server 720 or another computer. Management database 720 may include information about hardware and software configurations of a client, multiple clients, or all clients in a network. In particular, management database 720 may indicate what operating system and application programs are installed on a client or what software needs to be installed on the client in the future. Management database 720 may be updated automatically or manually when management server 710 manages client 701. For instance, management database 720 may be updated to reflect that a particular operating system is installed on client 701. In an exemplary implementation, management database 720 and management software of management server 710 may be integrated in one software package.

Management server 710 may query management database 720 directly in order to determine how client 701 should be managed. The query may, for example, enable management server 710 to determine whether an operating system should be installed on client 701, determine whether client 701 should boot from its own local storage medium, and select, if management database 720 does not provide information about the client, a set of default information. Default information may include any of a number of default options, such as booting to a local disk of client 701 or booting to a network-retrieved system that allows for temporary management of client 701.

In another embodiment, management server 710 may compare information recorded in management database 720 with a given client's current configuration. As such, management server 710 may recognize changes to the hardware and software configuration of the client.

Figure 8:
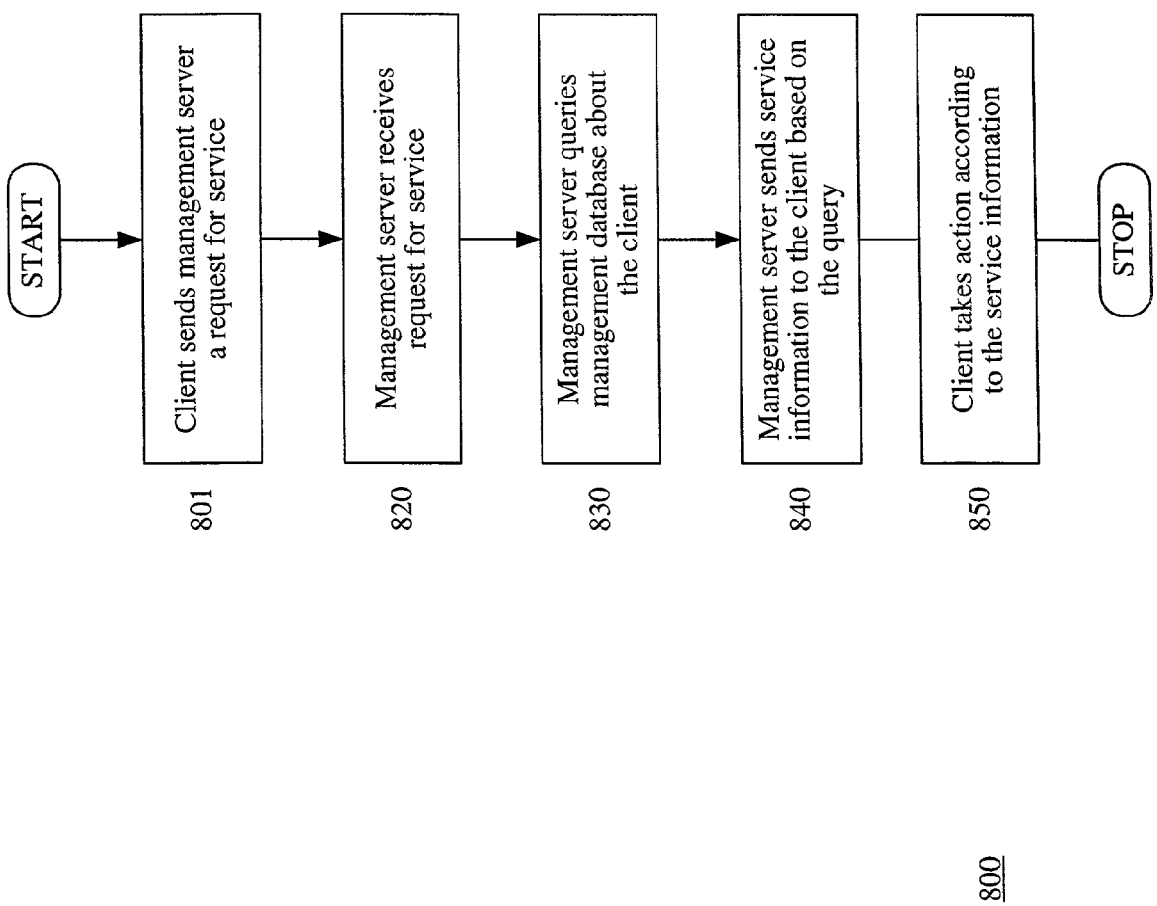
FIG. 8 is a high-level flow diagram of a method according to an embodiment of the present invention.

FIG. 8 is a high-level flow diagram of method 800 according to an embodiment of the present invention. In item 801, a client sends a management server a request for service. In item 820, the management server receives the request for service. The management server queries the management database about the client in item 830. The management server sends service information to the client based on the query in item 840. In item 850, the client takes action according to the service information.

Figure 9:
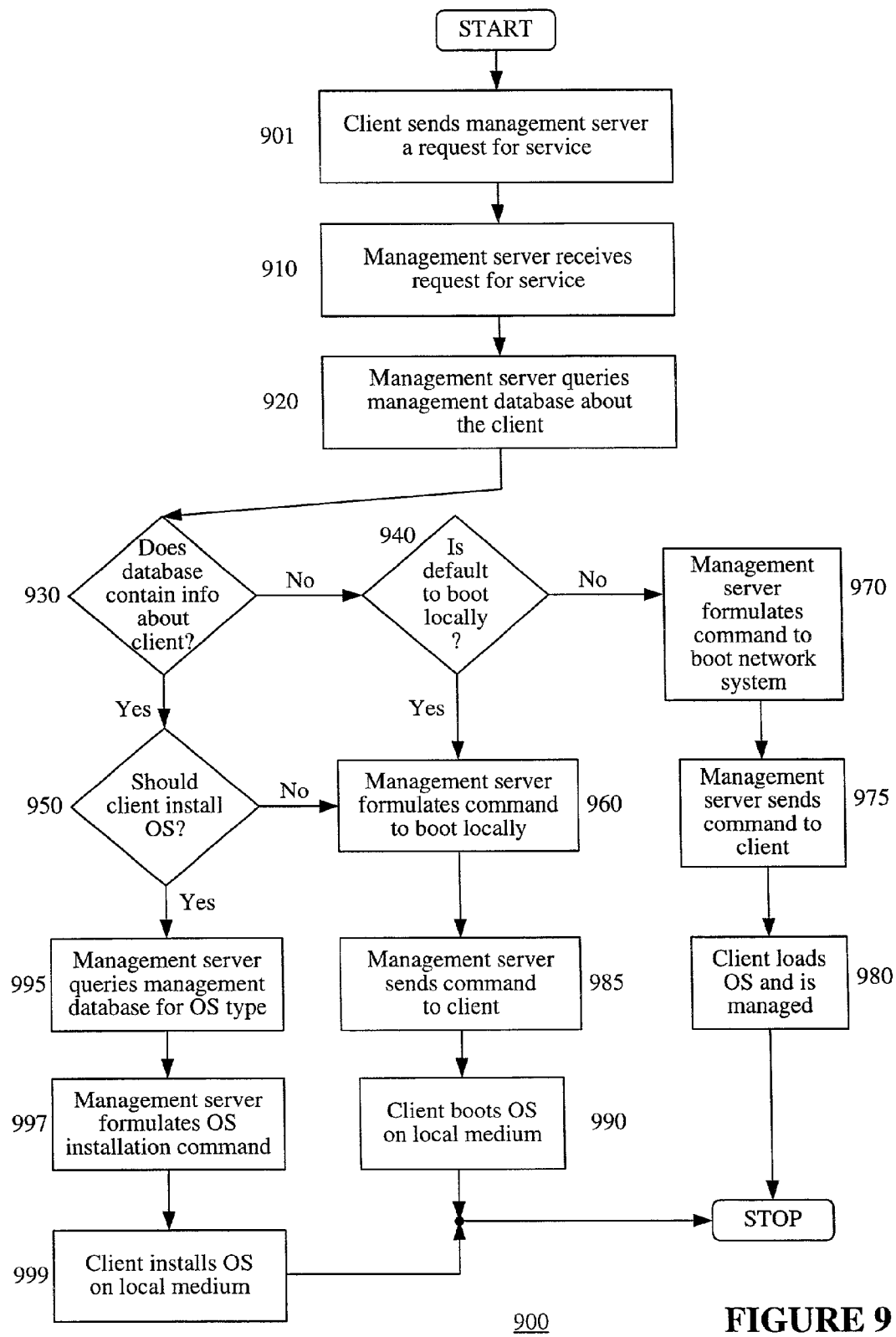
FIG. 9 is a high-level flow diagram of a method according to an embodiment of the present invention.

FIG. 9 is a high-level flow diagram of method 900 according to an embodiment of the present invention. In item 901, a client sends a management server a request for service. In item 910, the management server receives the request for service. In item 920, the management server queries the management database about the client. In item 930, the method tests whether the database contains information about the client of interest. If the answer is no, then in item 940, the method tests whether the default option is for the client to boot locally. If the answer is no, then in item 970, the management server formulates a command to cause the client to boot to a network system. In item 975, the management server sends a command to the client, and in item 980, the client loads the operating system and is managed.

Returning to item 940, if the default option is to boot locally, then in item 960, the management server formulates a command to boot locally. In item 985, the management server sends a command to the client. In item 990, the client boots to an operating system on a local medium of the client.

Returning to item 930, if the database does contain information about the client of interest, then in item 950, the method tests whether the operating system should be installed on the client. If not, then the method proceeds to item 960, as described above. If item 950 evaluates to yes, then in item 995, the management server queries the management database for the operating system type. The management server formulates an operating system installation command in item 997, and in item 999, the client installs the operating system on the local medium of the client.

The foregoing description of the preferred embodiments is provided to enable any person skilled in the art to make or use the present invention. Various modifications to these embodiments are possible, and the generic principles presented herein may be applied to other embodiments as well. For example, a management agent may be employed in conjunction with a management server that queries a management database.

Further, the invention may be implemented in part or in whole as a hard-wired circuit, as a circuit configuration fabricated into an application-specific integrated circuit, or as a firmware program loaded into non-volatile storage or a software program loaded from or into a data storage medium as machine-readable code, such code being instructions executable by an array of logic elements such as a microprocessor or other digital signal processing unit.

As such, the present invention is not intended to be limited to the embodiments shown above but rather is to be accorded the widest scope consistent with the principles and novel features disclosed in any fashion herein.

What is claimed:

1. A system, comprising:
   a client device, the client transmitting a request for an operating system utilizing the BOOTP protocol and setting an indicator identifying that this boot sequence is being made to a management server, a first virtual local area network (VLAN) including the client device;
   a pre-boot execution environment (PXE) agent device, the PXE agent device located on a first local area network with the client device, to receive the BOOTP request for the operating system, to open a hypertext transport protocol (HTTP) session, to convert the BOOTP request for the operating system to a HTTP request for the operating system; and to transmit the HTTP request for the operating system; and
   a pre-boot execution environment (PXE) server, the PXE server being located on a second local area network separated by at least one router from the first local area network and a second VLAN, distinct from the first VLAN, including the PXE server, to receive the converted HTTP request for the operating system, to retrieve the operating system requested in the converted HTTP request, and to transmit the retrieved operating system via HTTP, wherein the PXE agent device receives the retrieved operating system via HTTP, converts the HTTP protocol to the BOOTP protocol, and transmits the retrieved operating system to the client device utilizing the BOOTP protocol, wherein the client sets an indicator identifying that this boot sequence is being made to a PXE server.

2. The system of claim 1, wherein the PXE client and the PXE agent device communicate in a virtual local area network (VLAN).

3. The system of claim 1, wherein at least a switch physically separates the PXE client and the PXE server.

4. A method for operating a management server, comprising:
  receiving a pre-boot request from a PXE client, the PXE client requesting booting information utilizing the hipertext transport protocol (HTTP);
  querying a management database for booting information for the PXE client;
  receiving the booting information from the management database if the management database has the booting information for the PXE client, the booting information including instructions to install a specific operating system if the management database has booting information for the PXE client;
  transmitting, utilizing HTTP, both the instructions to install a specific operating system and the operating system to the PXE client if the management database has booting information for the PXE client; and
  transmitting, utilizing HTTP, a command for the PXE client to boot locally if the management database does not have booting information for the PXE client and default information in the management server for the PXE client indicates the PXE client should boot locally, wherein a first virtual local area network (VLAN) includes the PXE client and a second VLAN includes the management server, the first VLAN being distinct from the second VLAN.

5. The method of claim 4, further including transmitting a command to the PXE client to boot to an operating system on a network if the management information does not have booting information for the PXE client and the management server does not have default information for the PXE client.

6. The method of claim 4, wherein one of a switch or a router physically separates the client and the management server.

7. A method of utilizing a pre-boot execution environment (PXE) agent device, comprising:
  receiving a request for an operating system, the client transmitting the request utilizing the BOOTP protocol;
  opening a hypertext transport protocol (HTTP) session;
  converting the request for the operating system from the BOOTP protocol to a HTTP request which utilizes an HTTP protocol;
  transmitting the HTTP request for the operating system utilizing the HTTP protocol to a PXE server, the PXE server being located on a second local area network separated by at least one router from the first local area network;
  receiving a retrieved operating system from PXE server utilizing the HTTP protocol;
  converting the HTTP protocol to the BOOTP protocol; and
  transmitting the retrieved operating system to the PXE client device utilizing the BOOTP protocol, wherein a first virtual local area network (VLAN) includes the PXE client and a second VLAN includes the PXE server, the first VLAN being distinct from the second VLAN.

8. The method of claim 7 wherein the PXE client and the PXE agent device communicate in a virtual local area network.

9. A program code storage device, comprising:
  a computer-readable storage medium; and
  computer-readable data, stored on the computer-readable storage medium, the computer-readable data including instructions, which when executed, cause a processor to:
  receive a pre-boot request from a PXE client, the PXE client requesting booting information utilizing the hypertext transport protocol (HTTP);
  query a management database for booting information for the PXE client;
  receive the booting information from the management database if the management database has booting information for the PXE client, the booting information including instructions to install a specific operating system if the management database has booting information for the PXE client;
  transmit, utilizing HTTP, both the instructions to install a specific operating system and the operating system to the PXE client if the management database has booting information for the PXE client; and
  transmit, utilizing HTTP, a command for the PXE client to boot locally if the management database does not have booting information for the PXE client and default information in the management server for the PXE client indicates the PXE client should boot locally, wherein a first virtual local area network (VLAN) includes the PXE client and a second VLAN includes the management server, the first VLAN being distinct from the second VLAN.

10. The program code storage device of claim 9, including instructions which when executed cause the processor to transmit a command to the PXE client to boot to an operating system on a network if the management information does not have booting information for the PXE client and the management server does not have default information for the PXE client.

11. The program code storage device of claim 9, wherein one of a,switch or a router physically separates the client and the management server.

* * * * *